United States Patent [19]

Nishida et al.

[11] Patent Number: 4,736,410

[45] Date of Patent: Apr. 5, 1988

[54] TELEPHONE EQUIPMENT FOR REDUCED KEY OPERATIONS

[75] Inventors: Kouji Nishida, Anjo; Tetsushi Hiramitsu, Ichinomiya; Satoshi Ono, Inazawa, all of Japan

[73] Assignees: Aisin Seiki Kabushiki Kaisha, Kariya; Toyoda Gosei Co., Ltd., Nishikasugai, both of Japan

[21] Appl. No.: 783,682

[22] Filed: Sep. 27, 1985

[30] Foreign Application Priority Data

Sep. 28, 1984 [JP] Japan .................. 59-204991

[51] Int. Cl.$^4$ .......................................... H04M 1/274
[52] U.S. Cl. ...................................... 379/354; 379/58; 379/63
[58] Field of Search ........ 179/90 BD, 90 BB, 90 AD, 179/90 B, 2 EA; 379/58, 59, 61, 354, 355, 356; 340/365 R

[56] References Cited

U.S. PATENT DOCUMENTS

| D. 254,435 | 3/1980 | Ferron | D14/53 |
|---|---|---|---|
| 3,824,465 | 7/1974 | Blough | 455/89 |
| 4,266,102 | 5/1981 | Stanley et al. | 379/354 |
| 4,455,454 | 6/1984 | Umebayashi | 455/38 |
| 4,481,382 | 11/1984 | Villa-Real | 179/2 EA |
| 4,581,490 | 4/1986 | Genender | 379/424 |

FOREIGN PATENT DOCUMENTS

| 3410633 | 9/1985 | Fed. Rep. of Germany | 379/354 |
|---|---|---|---|
| 2430146 | 2/1980 | France . | |
| 0056226 | 4/1980 | Japan | 340/365 R |
| 55-141838 | 11/1980 | Japan . | |

OTHER PUBLICATIONS

*National Technical Report*, vol. 23, No. 5 (Oct., 1977), "Mobile Radio-Telephone System for Bahrain", T. Kawada, H. Shiomi, M. Yamato, N. Morita.
Detachable Mobile Radio Units for the 800 MHz Land Modile Radio System, K. Kobayashi, et al., IEEE Conference on Vehicular Technology, May, 1984, pp. 6-11.
27th Annual Conference IEEE Vehicular Technology Group (U.S.A.), Mar. 16-17, 1977, pp. 168-172, "An Improved Mobile Telephone Control Unit", Kahn.

*Primary Examiner*—Stewart J. Levy
*Assistant Examiner*—Lawrence G. Fess
*Attorney, Agent, or Firm*—Oblon, Fisher, Spivak, McClelland & Maier

[57] ABSTRACT

A microprocessor-based telephone set includes a telephone number memory, a number indicator, an abbreviated number scanning switch and associated control circuit, in addition to a push-button dial and a hook switch as equipped in the usual telephone set. Telephone numbers are preset in correspondence to abbreviated numbers, so that a telephone number is dialed automatically by simply specifying a corresponding abbreviated number using the scanning switch and indicator. By provision of an FM transceiver within the handset and a separate relay unit for establishing radio communication with the base telephone station, a mobile telephone system is configured.

1 Claim, 14 Drawing Sheets

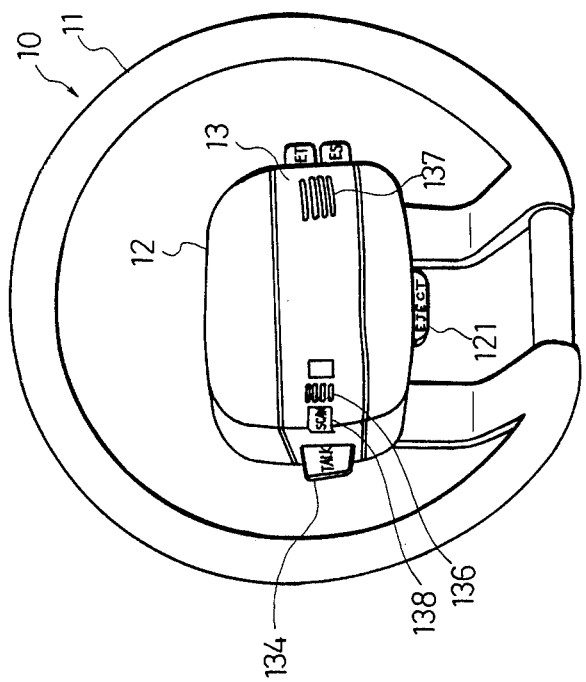

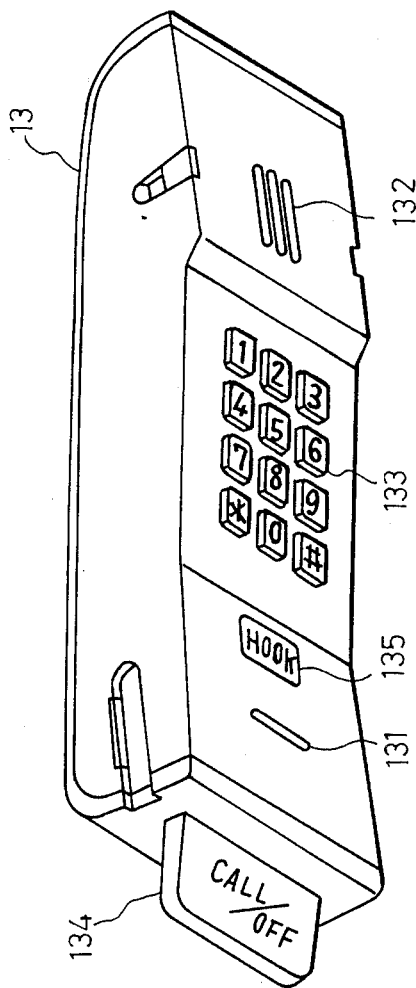
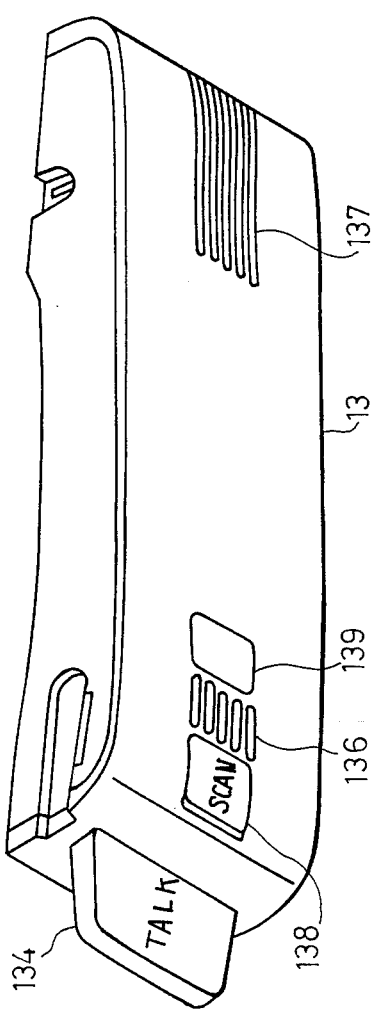

TELEPHONE EQUIPMENT FOR REDUCED KEY OPERATIONS

BACKGROUND OF THE INVENTION

The present invention relates to a telephone equipment with enhanced operability and, particularly, to a telephone equipment which enables the user to make a call through a reduced number of key operations and is also capable of memorizing and displaying telephone numbers of called parties. The telephone equipment of the present invention is particularly useful as a mobile telephone equipment operated by the vehicle driver.

With the recent advanced mobile telephone communications network, there is an increasing demand for installing the telephone equipment on vehicles, particularly, automobiles. However, the conventional mobile telephone equipment is of the same type as used indoors, and a special situation of usage on a vehicle is not taken into account. For example, the automobile driver receives a call and also makes a call during a drive. However, the indoor-type telephone set bothers the driver in dialing a telephone number, and it is often impracticable to have a calling operation during a drive, even if abbreviated telephone numbers are used.

SUMMARY OF THE INVENTION

The present invention contemplates overcoming the foregoing prior art deficiency, and its prime object is to provide a telephone equipment with enhanced operability.

In order to achieve the above objective, the inventive telephone equipment features a telephone number memory for storing called party's telephone numbers in correspondence to abbreviated numbers, an indicator for displaying a numeric character, an operating switch used to enter a binary signal, a number input device for entering a called party's telephone number, a decision means for determining the state of the operating switch, an abbreviated number selection means for scanning abbreviated numbers on the indicator in response to the operation of the operating switch detected by the decision means as the first decision result, a telephone number display means which looks up the telephone number memory and delivers a called party's telephone number corresponding to an abbreviated number selected by the abbreviated number selection means to the indicator in response to the second decision by the decision means, and a telephone number memory control means which stores a called party's telephone number entered through the number input device in the telephone number memory in correspondence to an abbreviated number selected by the abbreviated number selection means, in response to the third decision of the decision means.

BRIEF DESCRIPTION OF THE DRAWINGS

FIG. 5 is an illustration showing the telephone equipment according to another embodiment of this invention;

FIGS. 6 and 7 are perspective views showing the handset of this embodiment;

DETAILED DESCRIPTION OF THE INVENTION

Figure 1:
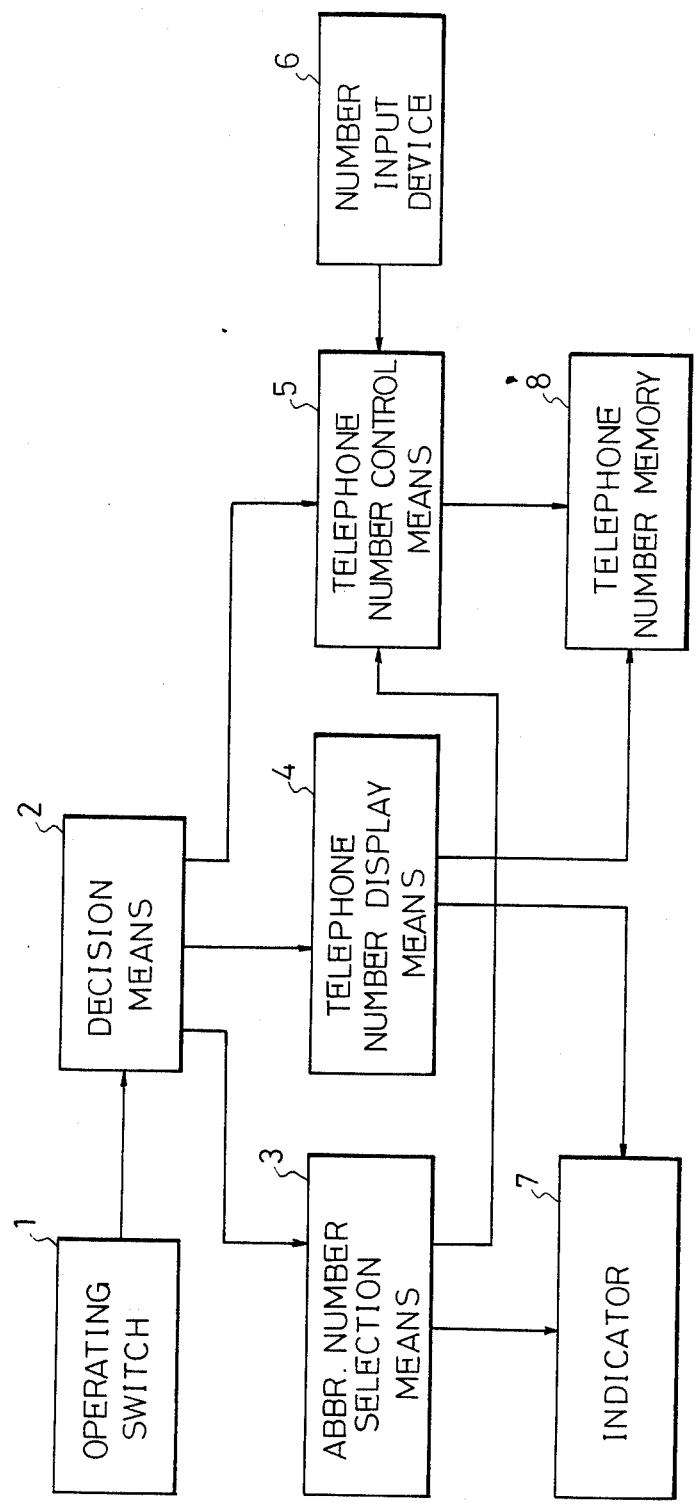
FIG. 1 is a block diagram showing the general arrangement of the inventive telephone equipment.

In FIG. 1, the inventive telephone equipment includes a telephone number memory 8 for storing called party's telephone numbers in correspondence to abbreviated numbers, an indicator 7 for displaying a numeric character, an operating switch 1 used to enter a binary signal, a number input device 6 for entering a called party's telephone number, a decision means 2 for detecting the state of the operating switch 1, an abbreviated number selection means 3 for scanning abbreviated numbers on the indicator 7 in response to the operation of the operating switch 1 detected by the decision means 2 as the first decision result, a telephone number display means 4 which looks up the telephone number memory 8 and delivers a called party's telephone number corresponding to an abbreviated number selected by the abbreviated number selection means 3 to the indicator 7 in response to the second decision by the decision means 3, and a telephone number memory control means 5 which stores a called party's telephone number entered through the number input device 6 in the telephone number memory 8 in correspondence to an abbreviated number selected by the abbreviated number selection means 3, in response to the third decision of the decision means 2.

Uses of the inventive telephone equipment are not limited, but it can be installed in vehicles such as automobiles, boats and aircrafts, and in buildings as well. The above-mentioned operating switch 1, indicator 7 and number input device 6 may be disposed in arbitrary locations, or they are preferably integrated on a handset together with a speaker and microphone thereby realizing a useful and compact telephone equipment. The handset may be linked with a main unit either through a cable or the radio. The operating switch 1 is a switch for producing a binary ON/OFF signal, and the number input device 6 is a dial or a push button key set. The abbreviated number selection device 3 operates to display an abbreviated number on the indicator 7 in response to the operation of the operating switch 1, in such a way of updating the number each time the operating switch 1 is pressed, or updating the number sequentially while the operating switch 1 is kept pressed, or alternatively updating the number sequentially by the first press and halting the number scan and selecting the current number by the second press.

The telephone number display means 4 retrieves a called party's telephone number from the telephone number memory 8 in correspondence to the selected abbreviated number and displays it on the indicator 7, which may have an arbitrary number of digits. A single-digit indicator suffices to read out a multi-digit telephone number on a digit-by-digit basis. The telephone number display means 7 is used to allow the user to check the integrity of the stored telephone number. The telephone number memory control means 5 operates on the telephone number memory 8 to store numbers entered through the number input device 6 in correspondence to abbreviated numbers selected by the abbreviated number selection means 3. The decision means 2 discriminates the above-mentioned three functions in response to the state of the operating switch, i.e., the duration of press, the number of pressing operations within a certain time length, or the combination of these. The abbreviated number selected by the number selection means is used for the calling operation on the telephone network, as well as displaying and storing the called party's telephone number.

The operation for storing a telephone number is as follows. In response to the operation of the operating switch 1, the abbreviated number selection means 3 displays abbreviated numbers sequentially on the indicator 7. Through this operation, the user selects an abbreviated number. Next, the user switches the function by pressing the operating switch 1 and enters a telephone number through the number input device 6. Then, the telephone number is stored in the telephone number memory 8 at a location corresponding to the abbreviated number. Subsequently, the user operates the operating switch 1 to have another abbreviated number on the indicator 7 and enters a new telephone number. This operating procedure is repeated, and several telephone numbers are registered in the memory.

For checking a stored telephone number, the user operates the operating switch 1 to select the abbreviated number and then switches the function by operating the operating switch 1 to activate the telephone number display means 4, with the result of the telephone number corresponding to the selected abbreviated number displayed on the indicator 7. For making a call, the user searches the memory for the intended telephone number using the abbreviated number displayed on the indicator 7, and takes the action for transmitting the selected telephone number.

DETAILED DESCRIPTION OF THE PREFERRED EMBODIMENTS

An embodiment of this invention will be described in more detail.

Figure 2:
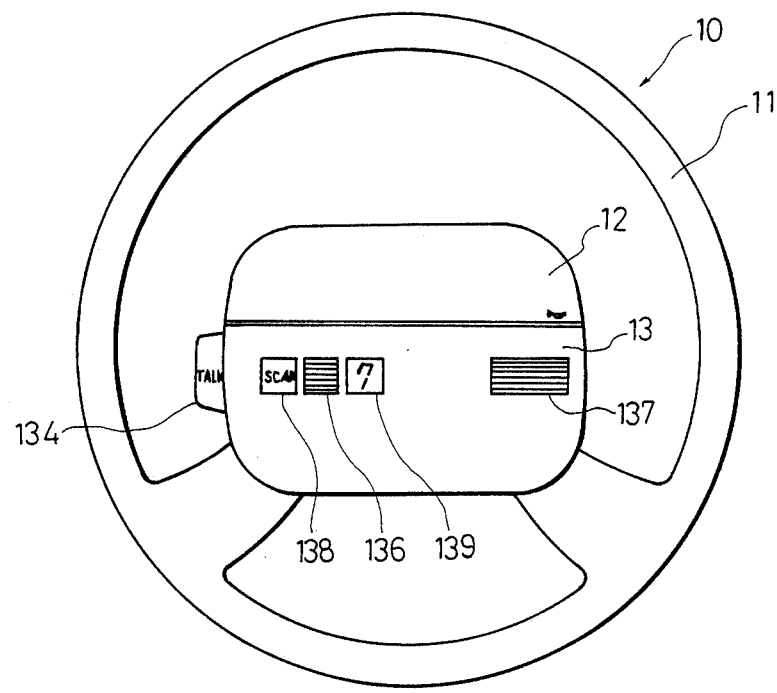
FIG. 2 is a plan view showing the operating panel of the telephone equipment embodying the present invention.

In FIG. 2 showing an operating panel of the inventive telephone equipment installed on the steering wheel of an automobile, there are provided in a pad 12 of a steering wheel 10 a station call switch 138 functioning as the operating switch for producing a binary ON/OFF signal, a microphone 136, a numeric indicator 139, a speaker 137, and a talk switch 134 for producing an off-hook and on-hook signals used to initiate and terminate a call.

Figure 3:
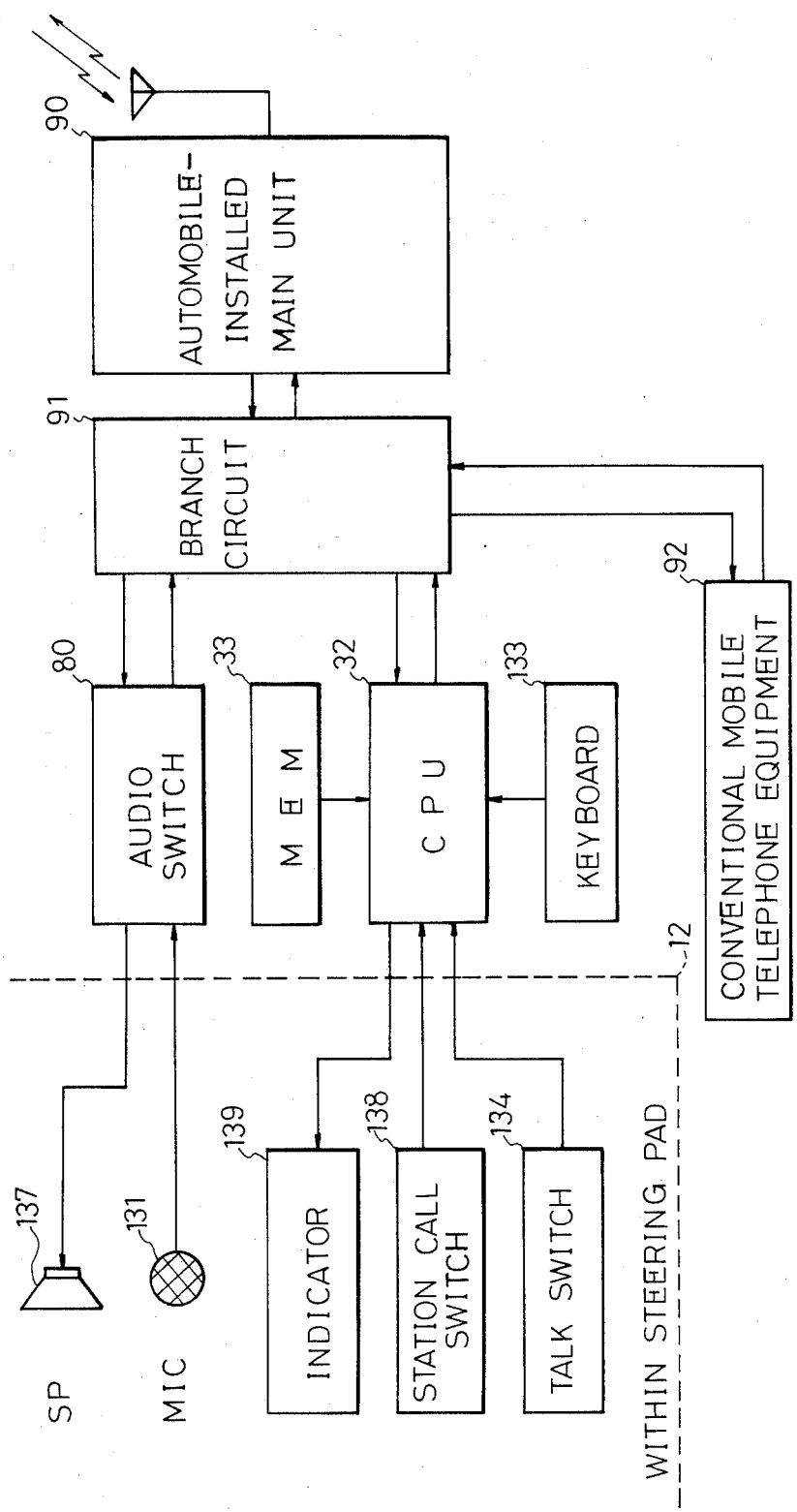
FIG. 3 is a block diagram showing the electrical arrangement of the above embodiment.

FIG. 3 shows in block diagram the electrical arrangement of the embodiment which is connected to an automobile-installed main unit 90. The main unit 90 links with a base telephone station through the radio for transmitting the initiation signal or termination signal in response to the off-hook or on-hook operation of the handset, transmitting a telephone number of a called party, and receiving a ring signal from the base telephone station.

A branch circuit 91 is provided, allowing the selective use of the conventional mobile telephone equipment 92 connected in parallel to the inventive telephone equipment. An audio switch 80 is used to avoid the howling when the inventive equipment is operated in loud-speech mode.

The principal portion of this embodiment is implemented by a computer system, in which a CPU 32 is connected with the indicator 139, station call switch 138, talk switch 134 and keyboard 133.

Figure 4:
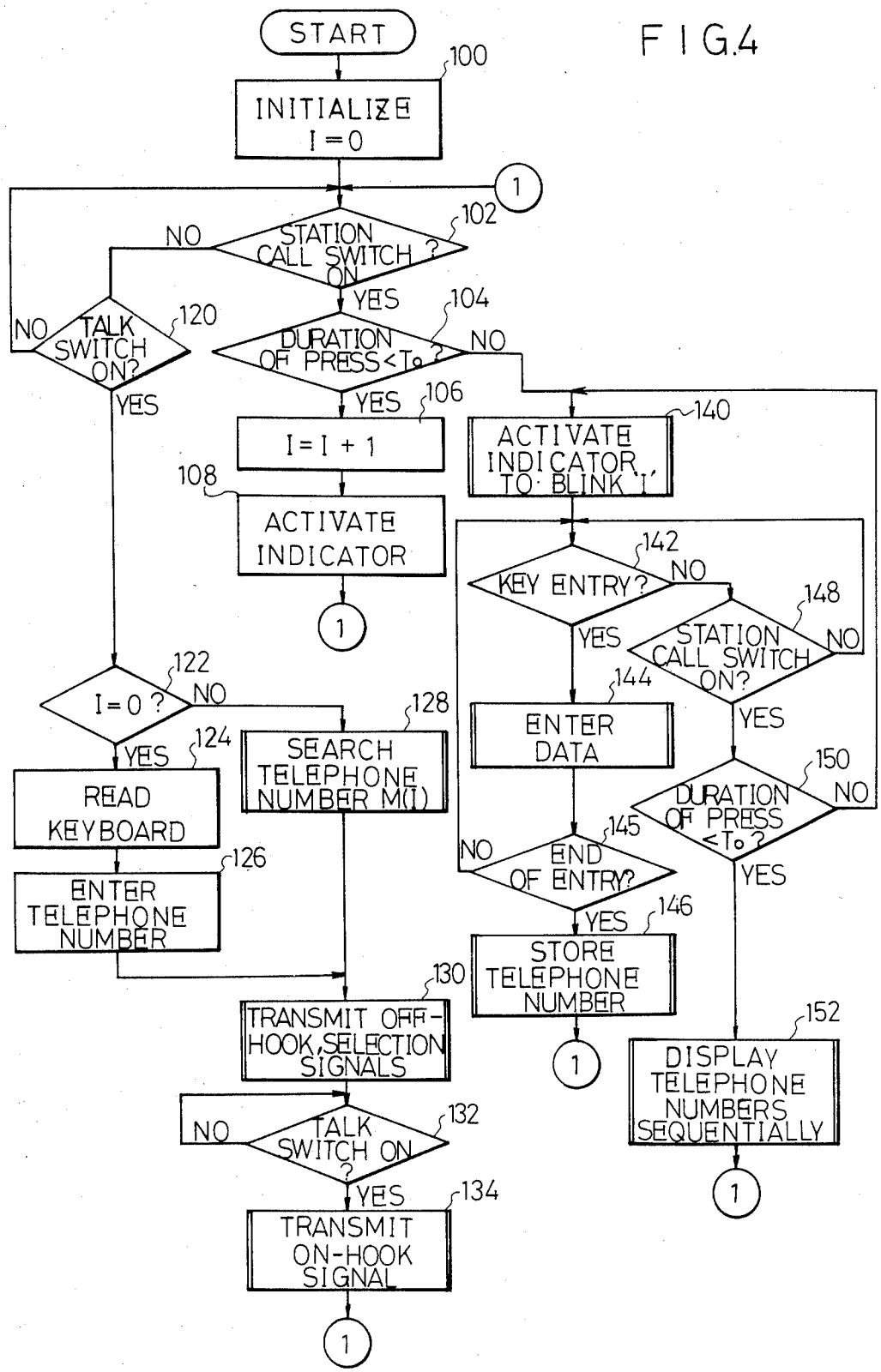
FIG. 4 is a flowchart showing the computer processing implemented in the above embodiment.

FIG. 4 is a flowchart showing the computer processing program adapted to this embodiment. The CPU 32 commences the execution of the program at step 100. In step 100, the initial values are set up for the system. Operating parameter I represents the abbreviated number ranging from 1 through 9, with number 0 indicating the unspecified state of the abbreviated number. The program sequence proceeds to step 102, in which it is tested as to whether the station call switch 138 has been operated. If the operation of the switch 138 is sensed, the duration of operation is compared with the preset time length To in step 104 and, if the duration is shorter than To, the sequence proceeds to step 106. Namely, a shorter operation of the station call switch causes the decision means to recognize it as the first decision result, which sets up the system function to select an abbreviated number. Step 106 increases the value of I by 1, and activates the indicator 139 to display the abbreviated number.

The sequence proceeds to step 120, in which the state of the talk switch is sensed, and it returns to step 102 if the switch is off. Namely, depending on the number of operations of the station call switch, the abbreviated number is scanned in step 106 and it is displayed on the indicator. Accordingly, through the iterative operation of the loop including steps 102–108, a desired abbreviated number is selected by the user. The value of I, when reaches 10, is reset to 0 and increased sequentially in response to each short-period operation of the station call switch. This operating loop 102–108 implements the function of the abbreviated number selection means mentioned previously.

In response to the operation of the talk switch following the selection of an abbreviated number, the sequence proceeds from step 120 to step 122. Unless I equals to 0, the sequence goes to step 128, in which the telephone number memory 8 is addressed in accordance with the value of I so as to retieve a corresponding telephone number.

In the subsequent step 130, the control signal is issued to the main unit 90 so that the call initiation signal and the selected telephone number are transmitted. The signal transmission is acknowledged by a ring signal sounded by the speaker 137, and communication is established when the called party lifts the handset. The communication is terminated by the operation of the talk switch 134. Namely, step 132 tests as to whether the talk switch is operated, and in response to the detection the on-hook signal is issued to the main unit 90.

In this way, the abbreviated numbers are scanned to select a specific number, which retrieves the telephone number of the selected called party so that the telephone communication is established. The parameter I of 0 in step 122 signifies that no abbreviated number is selected and in this case the sequence proceeds to step 124 in which the formal telephone number is entered through the keyboard 133 as in the usual dialing operation.

In the next step 104, if the station call switch is determined to have been pressed longer than the specified time length, the decision means makes the second or third decision, and the sequence proceeds to step 140. In step 140, the selected abbreviated number I is displayed by blinking on the indicator thereby to draw user's attention. Subsequently, if there is a keyboard input, the sequence proceeds to step 144. In this case, the system makes a transition of function to receive a formal telephone number as a result of the third decision. The telephone number entered in step 146 is stored in the telephone number memory 8 in correspondence to the abbreviated number.

In another case when there is no keyboard entry in step 142, the sequence goes to step 148, in which it is tested as to whether the station call switch has been operated successively. If switch operation is not sensed, steps 142 and 148 are executed repeatedly. In case the station call switch has been pressed shorter than the specified time length To, the sequence proceeds to step 152. This is the result of the second decision to make a transition of function in which the formal telephone numbers corresponding to the abbreviated numbers are displayed sequentially on the indicator. These operations are repeated and finally the sequence returns to step 102. In step 150, if the station call switch is determined to have been pressed longer than the specified time length To, the sequence goes to step 140 so as to implement the selection of the second or third decision from the beginning. This allows the user, when making a mistake in entering data in step 144, to reenter a correct telephone number from the beginning by operating the station call switch.

Through the above operations, formal telephone numbers can be memorized in correspondence with abbreviated numbers, and each stored telephone number can be read out on the 1-digit indicator 139 on a digit-by-digit basis. It is also possible to scan abbreviated numbers to select one and make a call through the automatic search for the telephone number corresponding to the selected abbreviated number.

Next, the second embodiment of this invention will be described. This embodiment is intended to apply to a mobile telephone system equipped in an automobile, and a telephone handset with integration of functions is held detachably in the pad of the steering wheel. The handset links by a FM radio with a mobile main unit which performs transmission and reception between the automobile and the ground base telephone station.

FIG. 5 is a perspective view showing the arrangement of this embodiment. A steering wheel 10 is made up of a ring portion 11 and a pad 12. The pad 12 is designed to hold a handset 13 detachably. The handset 13 is taken out of the pad 12 by operating the eject button 121. FIGS. 6 and 7 are perspective views showing the front and back of the handset 13, respectively. The handset 13 includes on its backside a microphone 131, a speaker 132 used in closed-speech mode, a calling push button key set 133, a speech control talk switch 134, and a hook switch 135. The handset 13 includes on its front side a voice collection port 136 at the microphone 131 used in loud-speech mode, a speaker 137 used in loud-speech mode, a station call switch 138 used to retrieve called party's telephone numbers which have been memorized in advance, and an indicator 139 for displaying an abbreviated number of a called party.

The telephone equipment of the second embodiment allows the automobile driver to make a telephone call in loud-speech mode, with the handset 12 held in the pad 12, by specifying a called party through the scanning of the stored telephone numbers using the station call switch 138. The equipment also allows the normal usage in closed-speech mode when the handset 12 is taken out of the pad 12, by dialing a telephone number on the push buttons 133 or by use of the station call switch 138.

Figure 8:
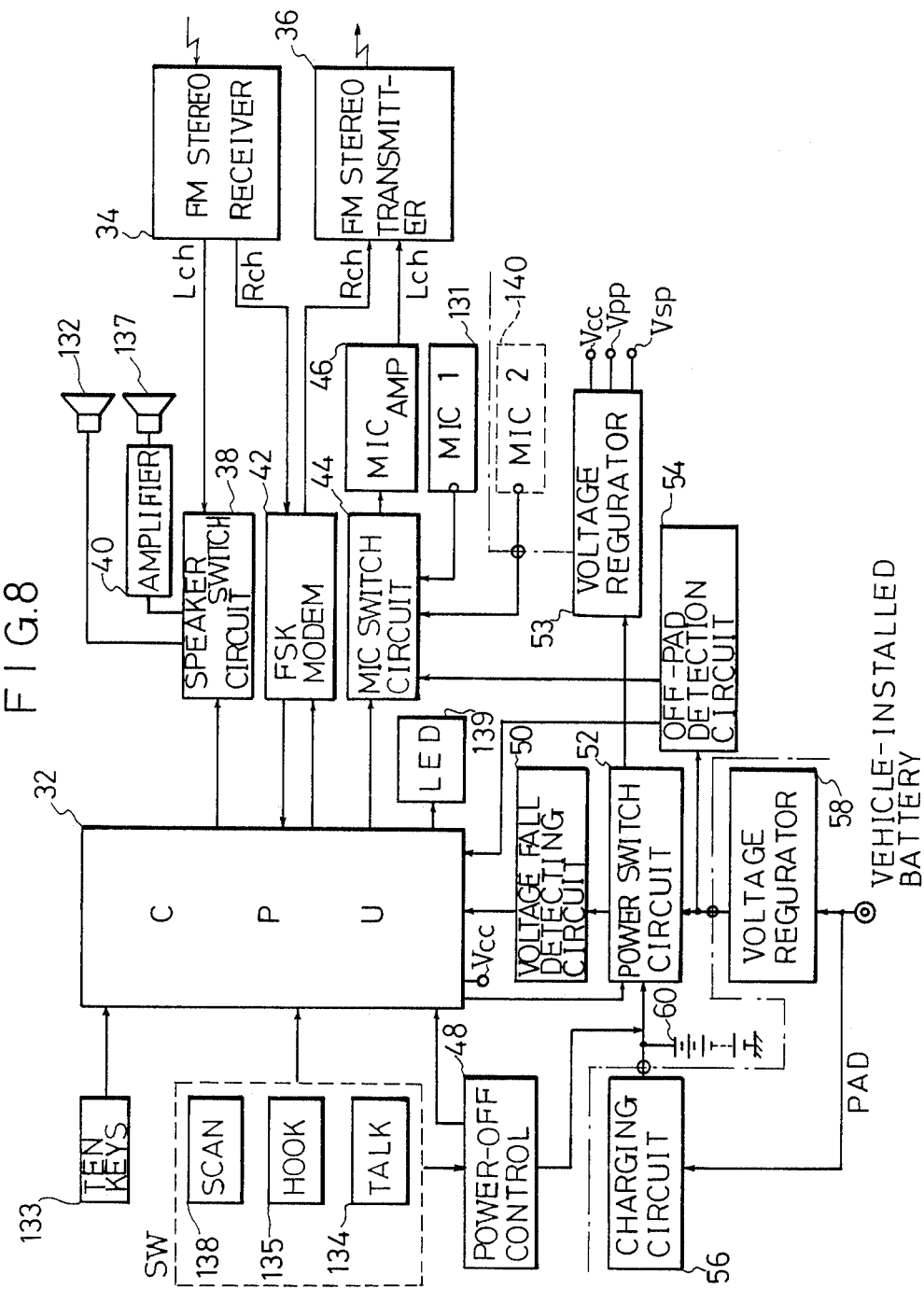
FIGS. 8 and 9 are block diagrams showing the electrical arrangement of the above embodiment.
Figure 9:
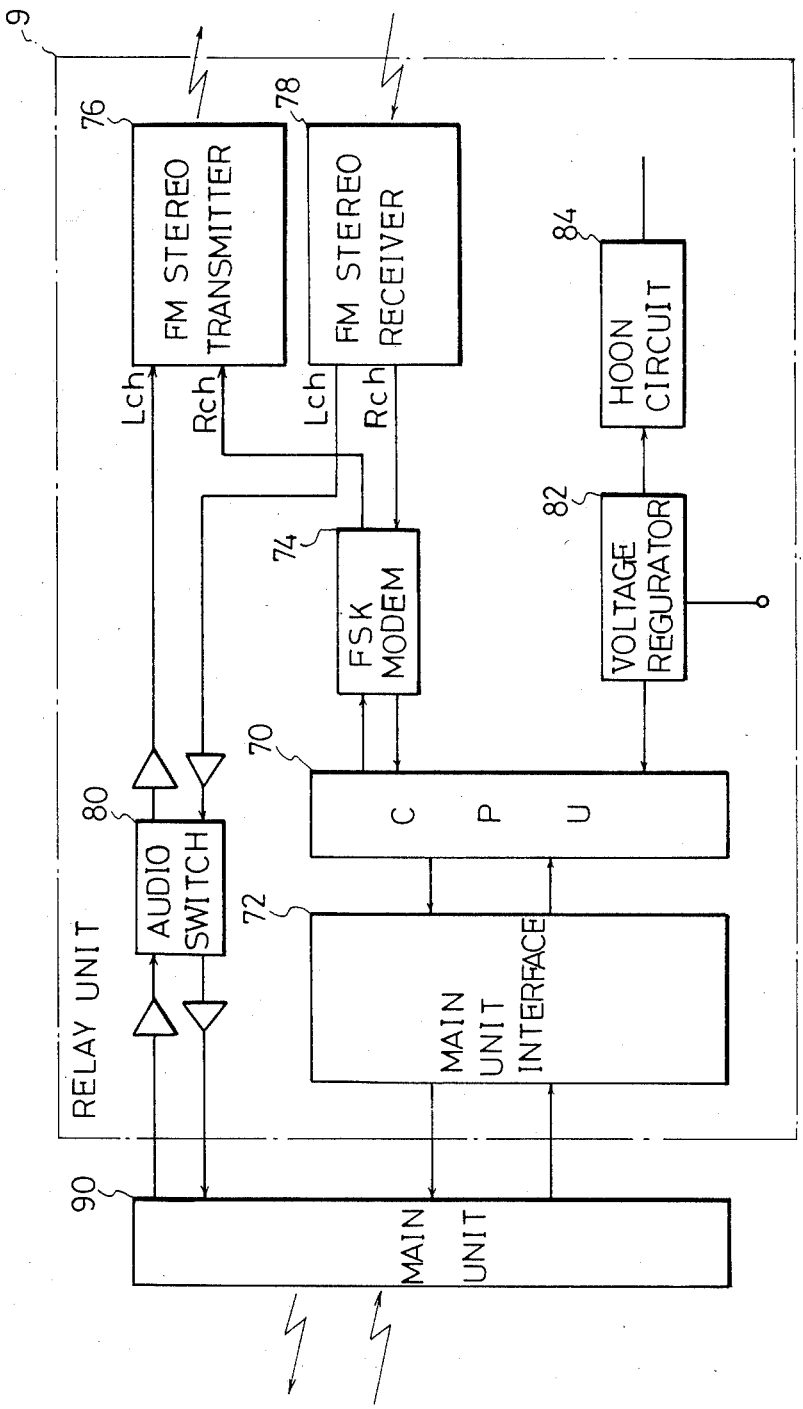
Figure 10A:
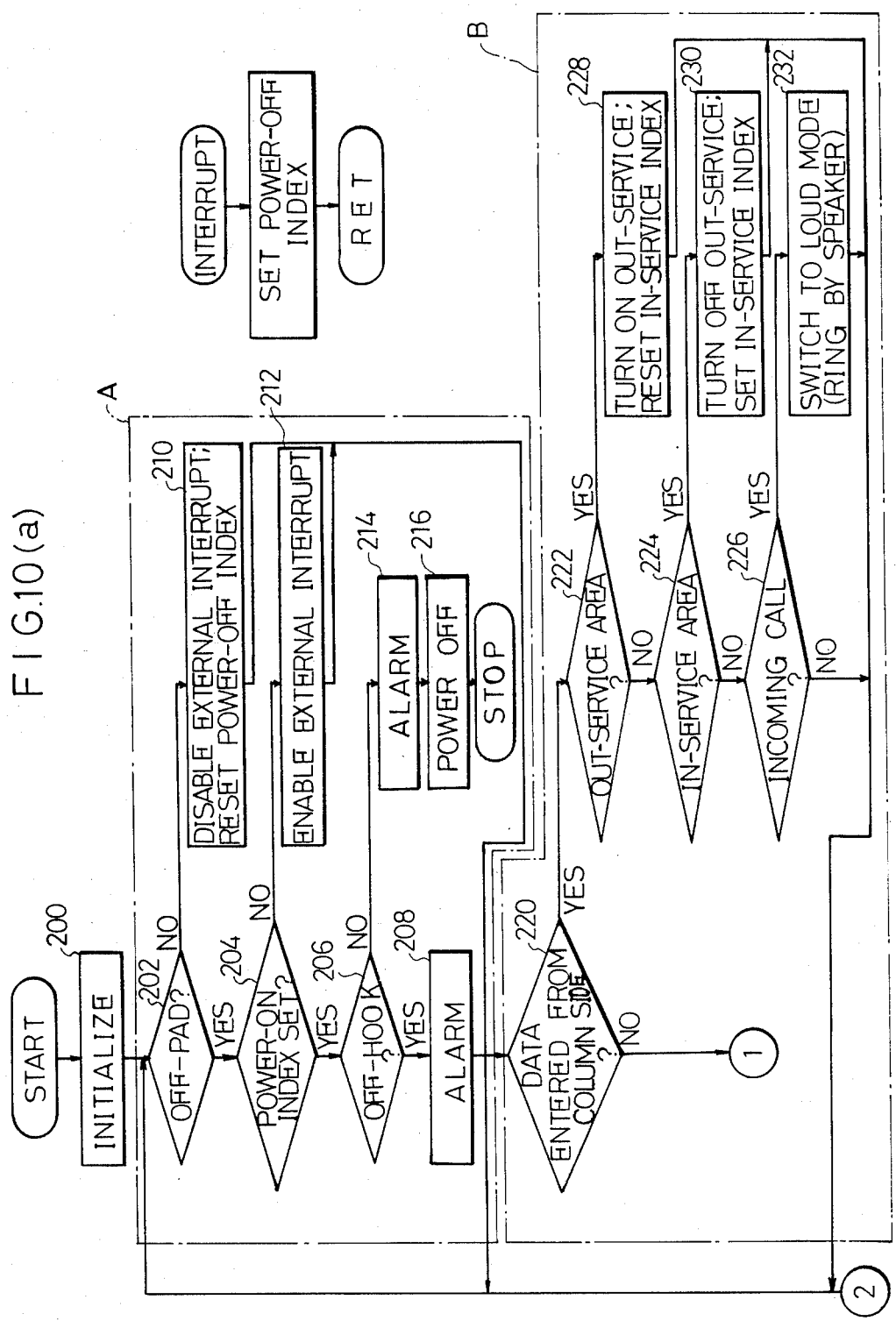
FIGS. 10($a$), 10($b$), 10($c$), 10($d$), 10($e$) and 11 are flowcharts showing the computer processing implemented in the above embodiment.
Figure 10B:
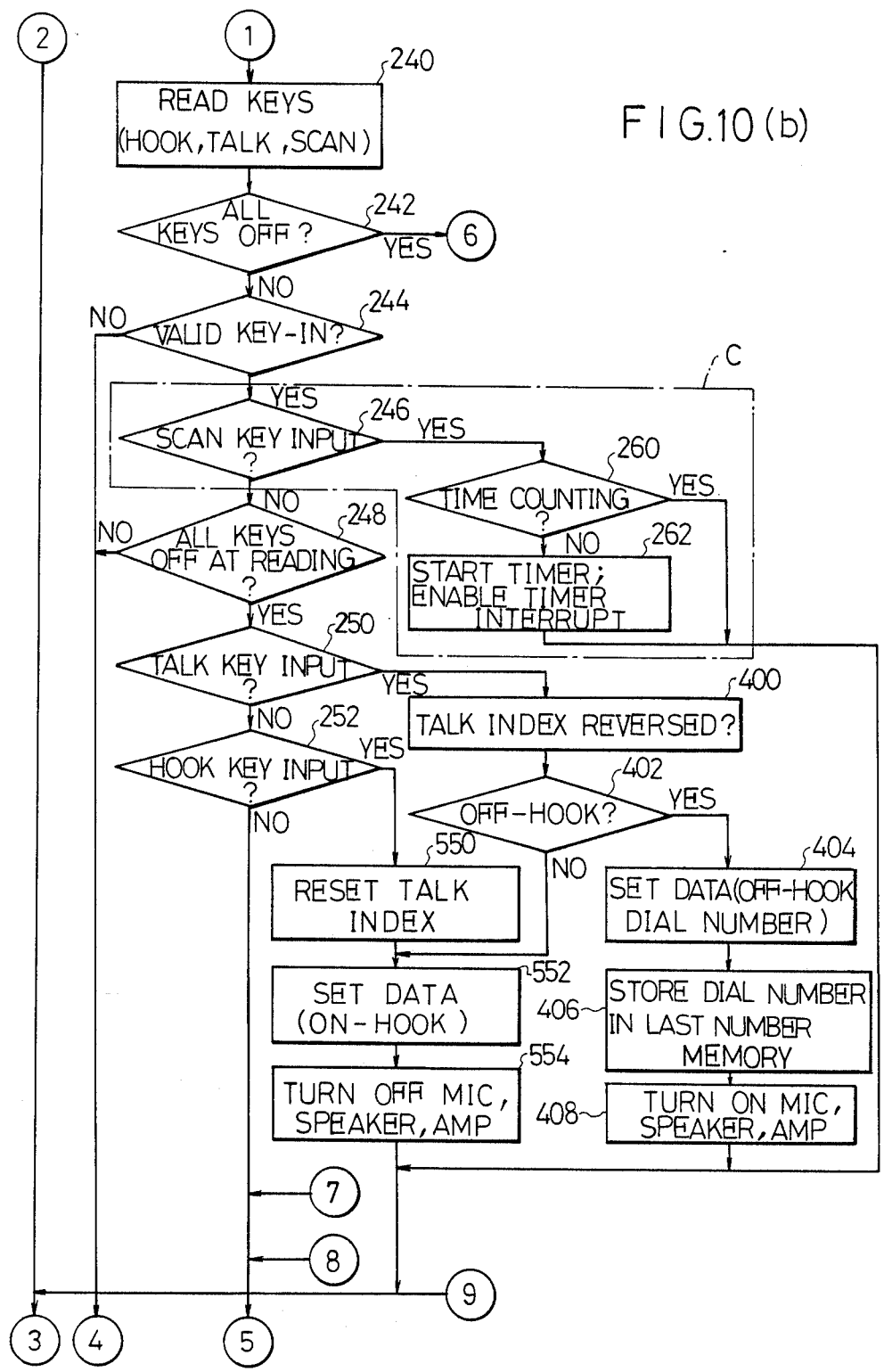
Figure 10C:
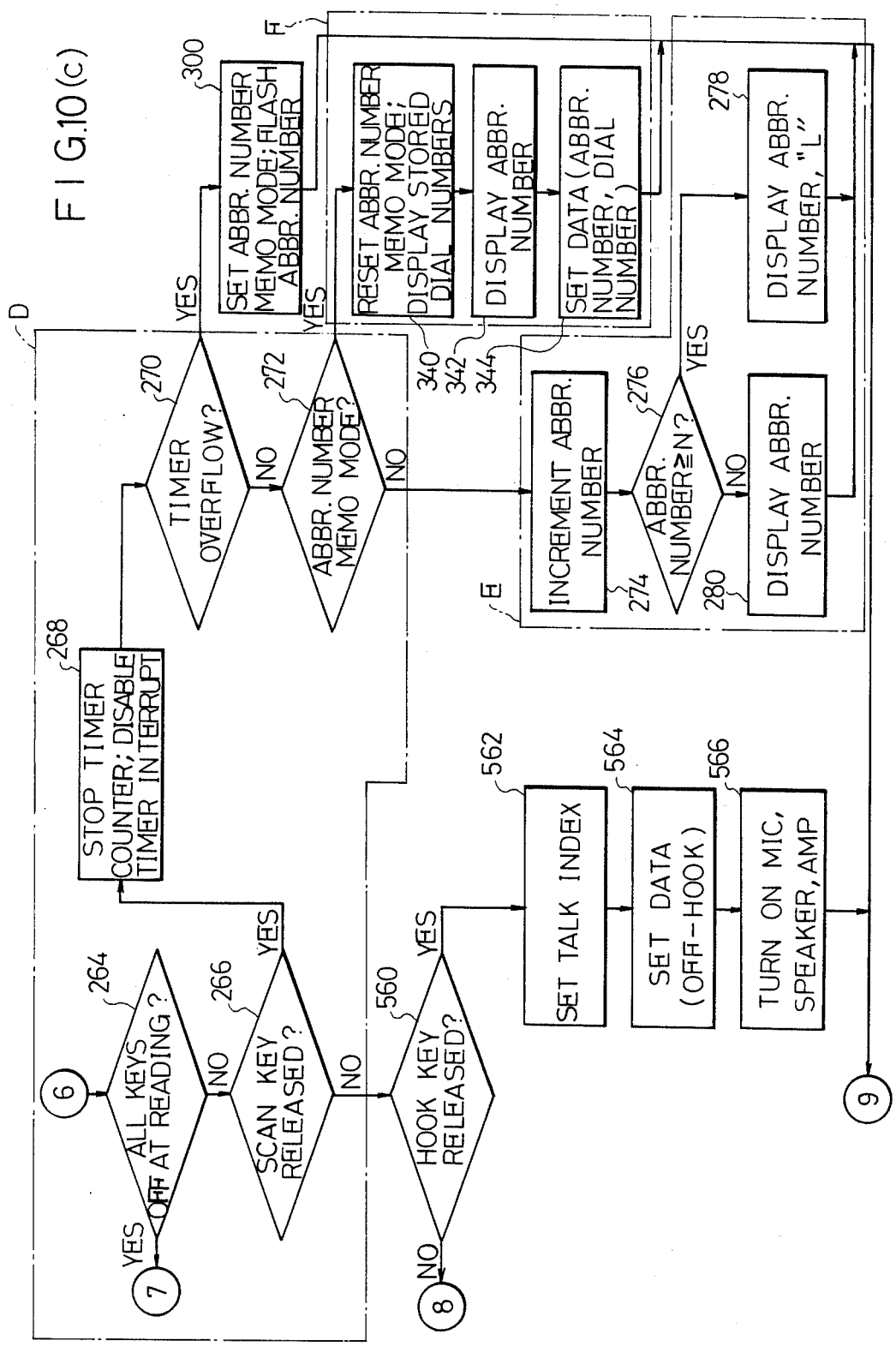
Figure 10D:
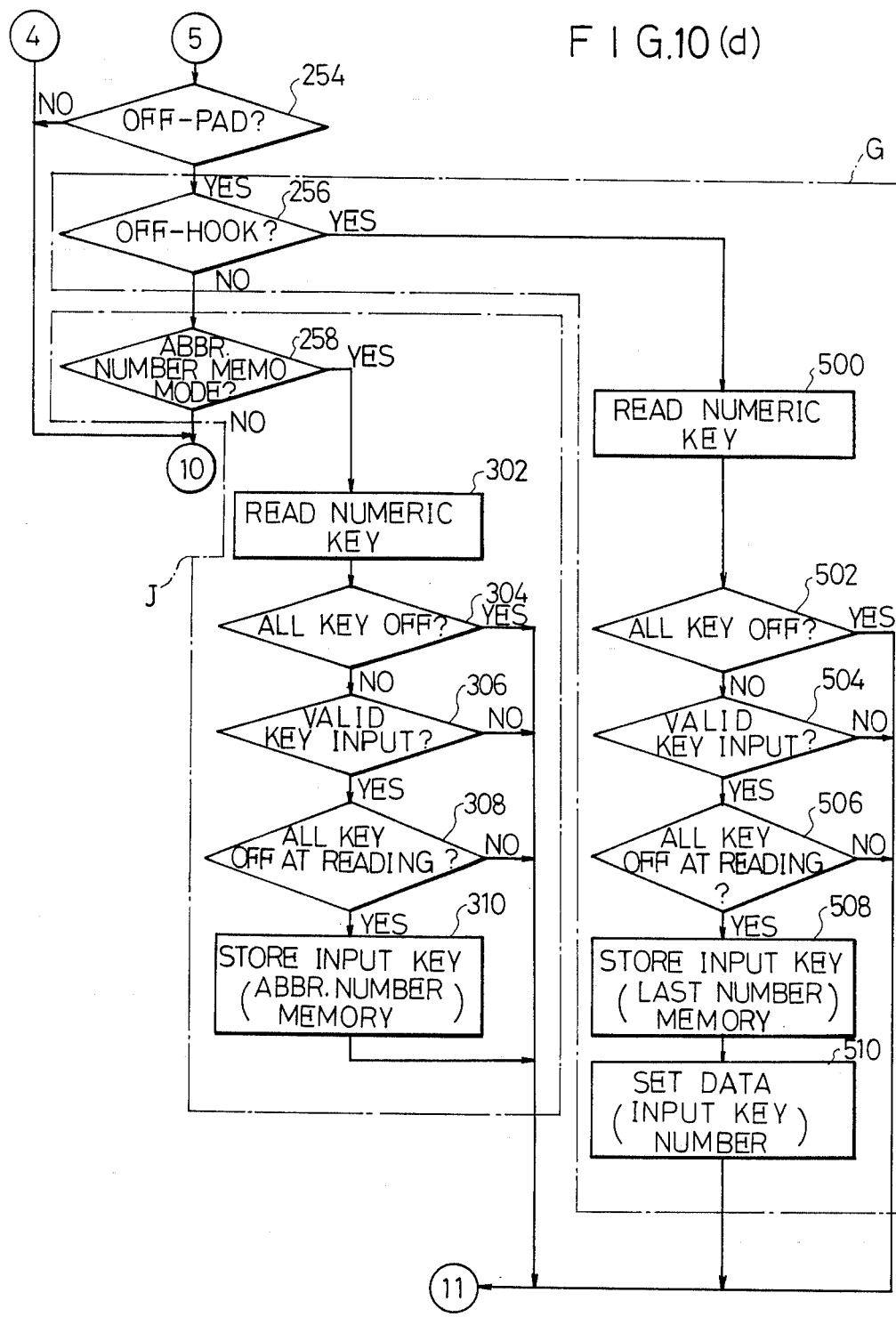
Figure 10E:
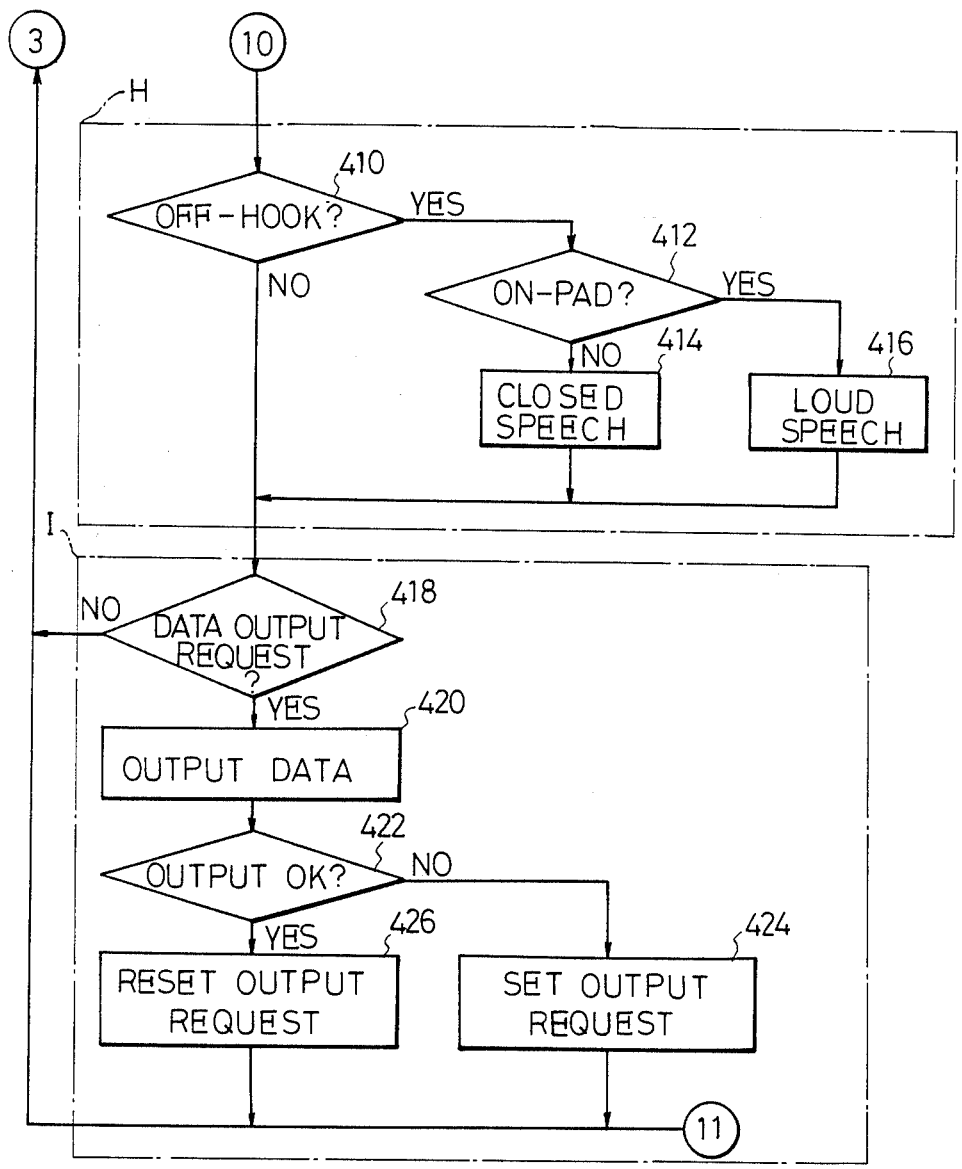

FIG. 8 shows in block diagram the circuit arrangement provided in the pad 12 and handset 13, and FIG. 9 shows the circuit arrangement of the relay unit installed in the user's automobile. Control within the handset 13 is implemented by a CPU (Central Processing Unit) 32, which is in connection with a push button key set 133, station call switch 138, hook switch 135 and talk switch 134. The control signals produced by these operating switches are processed by the CPU 32, and after being frequency-modulated by a modem 42, delivered to an FM stereo transmitter 36.

In closed-speech mode, a microphone switch circuit 44 selects the audio signal from the microphone I 131 and delivers it through an amplifier 46 to the FM stereo transmitter 36. The control signals are treated dividedly in the right channel and left channel, and the FM radio wave transmitted by the transmitter 36 is received by an FM stereo receiver 78 in the relay unit.

The FM radio wave transmitted by an FM stereo transmitter 76 in the relay unit is received by an FM stereo receiver 34, and the audio signal is delivered through a speaker switch circuit 38 to the speaker 132 in closed-speech mode, or to the speaker 137 via an amplifier 40 in loud-speech mode.

The circuitry within the handset 13 is powered by the vehicle-installed battery through a voltage regulator 58 provided in the pad 12 when the handset is held in the pad. The battery is also used to charge a rechargeable cell 60 in the handset 13 through a charging circuit 56 provided in the pad 12. When the handset 13 is taken out of the pad 12, an off-pad detection circuit 54 operates on a power switch circuit 52 through the CPU 32, and the handset 13 is powered by the rechargeable cell 60. The voltages supplied by these power sources are converted into several voltages by a voltage regulator 53.

The relay unit 9 incorporates a main unit interface 72, a CPU 70, an FM stereo transmitter 76, an FM stereo receiver 78, a modem 74 and an audio switch 80. Among the FM radio wave received by the FM stereo receiver 78, the audio signal is delivered through the audio switch 80 to the audio signal input terminal of the main unit 90, while the control signal encoded by the modem 74 is fed to the CPU 70 and after being processed delivered through the main unit interface 72 to the control input signal terminal of the main unit 90.

When the off-pad detection circuit 54 in the handset 13 detects that the handset is held in the pad 12, the CPU 32 selects the speaker 137 and activates both microphone I 131 and microphone II 140 installed in the pad so as to form a gradient microphone for the speech operation in loud-speech mode.

In this state, when the system receives an incoming call, a ring is sounded by the speaker 137. Then, the user talks in loud-speech mode by operating the talk switch 134. On completion of communication, the talk switch 134 is operated again so that the system is removed from the telephone network. In more detail, the CPU 32 has memorized the state of the talk switch 134, and sends the off-hook signal or on-hook signal depending on the switch position to the CPU 70 in the relay unit, then the CPU 70 sends the off-hook signal or on-hook signal to the main unit 90, which in turn transmits the initiation signal or termination signal to the base telephone station to connect or release the telephone network.

To make a call, the user operates the station call switch 138 to read out the preset abbreviated telephone numbers on the indicator 139. Upon selection of a called party's number, the CPU 32 sends the telephone number corresponding to the abbreviated number to the main unit 90 via the CPU 70 in response to the operation of the talk switch 134. The main unit 90 transmits the telephone number to the base station, which then rings the called party through the exchange and network and, at the same time, issues a ring signal to the mobile main unit 90 with the result that a ring is emitted by the speaker 137. When the called party responds to the ring, the connection is established between both parties through the network. In response to the operation of the talk switch 134 upon termination of communication, the CPU 32 issues the on-hook signal and the main unit 90 transmits the termination signal to shut down the line connection. As will be appreciated, the talk switch 134 functions identically to the hook switch equipped in the usual telephone set.

Next, the operation in closed-speech mode will be described. When the handset 13 is taken out of the pad 12, the off-pad detection circuit 54 issues the signal to the CPU 32, which then selects the microphone 131 and speaker 132. The ring signal is sounded by the speaker 137. The same operating procedures are used to respond to an incoming call and to make calling. In this mode, a call can be made also by dialing a formal telephone number of a called party by use of the hook switch 135 and push button key set 133. To terminate a call, the user operates the talk switch 134, and the onhook signal is produced so that the main unit 90 transmits the termination signal.

FIGS. 10(a)-10(e) are flowcharts showing the processing of the CPU 32 accommodated within the handset. Part A including steps 202 through 216 is a processing routine dealing with the operation against power voltage variation. As mentioned previously, the handset is supplied with power from the vehicle battery when it is held in the pad, or from its own rechargeable cell when it is taken out of the pad. If the voltage of the rechargeable cell falls below a certain level, an external interrupt is generated so that the CPU halts the processing.

Part B including steps 220 through 230 is a processing routine specific to the mobile communication, dealing with the operation of the case when the vehicle has gone out of the service area of the base telephone station.

A routine including steps 240 through 258 reads the states of the operating keys. A routine of part C including steps 246, 260 and 262 counts time in which the station call switch (SCAN switch) 138 is depressed. Part D including steps 264 through 272 is to evaluate the time length of depressing of the switch 138, and it is equivalent to the decision means. Part E including steps 274 through 280 selects an abbreviated telephone number through the incrementing operation, and reads out the selected number on the indicator. Part E is equivalent to the abbreviated number selection means. Part F including steps 340 through 344 is to display stored telephone numbers sequentially during the scanning operation. The routine F is equivalent to the telephone number display means. This routine is initiated when the station call switch is operated for at least the specified duration and then operated again for a duration less than the specified time length.

Part J including steps 258 and 302-310 is a processing routine for fetching a telephone number from the keyboard in correspondence to the selected abbreviated number and storing the telephone number. The routine J is equivalent to the telephone number memory control means. This routine is initiated when the station call switch is operated for at least the specified duration and then the keyboard is operated.

Through these operating steps, the inventive telephone equipment allows the calling of a called party by scanning the abbreviated numbers and also displaying and memorizing corresponding telephone numbers.

Part G including steps 500 through 510 is the transmission process for the operation using the hook switch 135 and push button set 133. The last digit of the calling number is memorized so as to allow a simple re-calling with the talk switch 134 when character "L" is displayed on the indicator 139. Part H including steps 410 through 416 selects the loud-speech mode or closed-speech mode depending on the presence or absence of the handset in the pad. Part I including steps 418 through 426 is a processing routine for sending the signal to the computer within the relay unit in correspondence to the selected telephone number.

Figure 11:
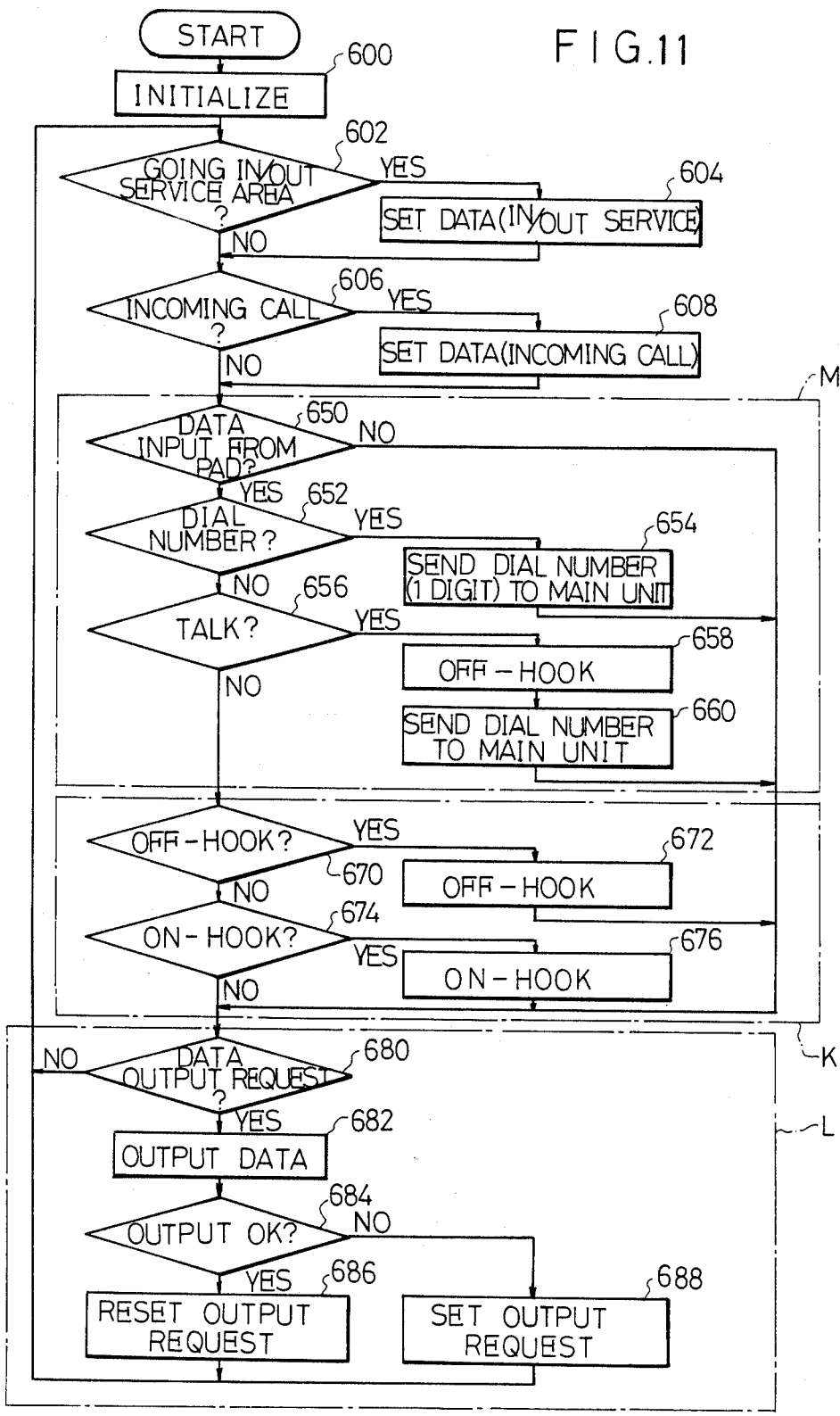

FIG. 11 is a flowchart showing the processing of the CPU 70 within the relay unit. Steps 602 and 604 are for the process when the vehicle has gone out of the service area. Steps 606 and 608 deal with incoming call. Part M including steps 650 through 660 is a routine for sending a telephone number from the handset to the main unit. When the talk switch is operated as sensed in step 656, step 658 produces the off-hook signal and step 660 outputs the telephone number. Part K including steps 670 through 676 is a routine for sending the on-hook or off-hook signal to the main unit depending on the state of the talk switch. Part L including steps 680 through 688 is a routine for outputting data to the handset in response to the reception of an incoming call by the mobile equipment main unit.

The present invention is embodied by the foregoing circuit arrangement and its operation.

What is claimed is:

1. A telephone equipment for mounting on automobiles comprising:

a memory means for storing abbreviated numbers and telephone numbers in correspondence with the abbreviated numbers;

an indicator for displaying a numeric character read out from said memory means;

an operating switch for reading out the abbreviated numbers or telephone numbers in correspondence with the abbreviated numbers, or for designating the telephone number input;

numeric input keys for inputting telephone numbers;

a decision means for determining the on-state of said operating switch as a designation of reading out an abbreviated number in case the on-state time is shorter than a predetermined time, and for determining the on-state of said operating switch as a designation of reading out or memorizing a telephone number in correspondence with the abbreviated number in case the on-state time is longer than the predetermined time;

a memory control means for memorizing numbers inputted by said numeric input keys to said memory means as a telephone number in correspondence with an abbreviated number displayed on said indicator in case the on-state time of said operating switch is longer than the predetermined time and after that numbers are inputted by said numeric input keys, and for reading out a telephone number in correspondence with an abbreviated number displayed on said indicator from said memory means in case said operating switch is in a second on-state before all of the numbers are inputted and the second on-state time is shorter than the predetermined time;

an indicator control means for controlling said indicator to display abbreviated numbers or telephone numbers in response to signals from said decision means and/or said memory control means and to flash an abbreviated number when the on-state time of said operating switch, which is longer than the predetermined time, occurs; and a call control switch for controlling the start of a telephone call in correspondence with an abbreviated number displayed on said indicator.

* * * * *

UNITED STATES PATENT AND TRADEMARK OFFICE
CERTIFICATE OF CORRECTION

PATENT NO. : 4,736,410
DATED : APRIL 5, 1988
INVENTOR(S) : Kouji NISHIDA ET AL

It is certified that error appears in the above-identified patent and that said Letters Patent is hereby corrected as shown below:

Column 4, lines 31 and 32, please change "The value of I, when reaches 10," to --When the value of I, reaches 10,--.

Column 4, line 42, please change "retieve" to --retrieve--.

Column 7, line 32, please change "onhook" to --on-hook--.

Signed and Sealed this

Fourth Day of October, 1988

Attest:

DONALD J. QUIGG

Attesting Officer

Commissioner of Patents and Trademarks